United States Patent
Cruvellier et al.

[11] 3,730,626
[45] May 1, 1973

[54] MONOCHROMATORS WITH CONCAVE SPHERICAL GRATINGS

[75] Inventors: Paul E. Cruvellier, Marseille; Michel Duban, Gemenos, both of France

[73] Assignee: Centre National d'Etudes Spatiales, Paris, France

[22] Filed: Feb. 11, 1972

[21] Appl. No.: 225,501

[30] Foreign Application Priority Data

Feb. 11, 1971  France.....................................04612

[52] U.S. Cl......................................356/101, 356/51
[51] Int. Cl..........................G01j 3/12, G01n 21/34
[58] Field of Search......................356/51, 92, 94, 98, 356/99, 100, 101; 250/43.5 R, 83.3 UV

[56] References Cited

UNITED STATES PATENTS 2,948,184   8/1960   Johnson ...............................356/100

Primary Examiner—Ronald L. Wibert
Assistant Examiner—V. P. McGraw
Attorney—Alfred W. Breiner

[57] ABSTRACT

This invention relates to a monochromator with a rotating concave spherical grating in which the source-to-grating distance L is equal to $$[2R \sin\phi \cos i_m]/2\sin\phi - (k\phi_m/a)\cos r_m]$$

Where $\phi$ is the angle of deviation of the beam, $R$ is the radius of curvature of the grating, $\lambda_m$ is the mean working wavelength, $i_m$ and $r_m$ are the angles of incidence and of diffraction for $\lambda_m$, $a$ is the pitch of the grating and $k$ is the order of the operative procedure, the angle $\phi$ being less than 40° but at least equal to $k^-\lambda_m/a$. The monochromators can be used for studying photomultipliers.

5 Claims, 1 Drawing Figure

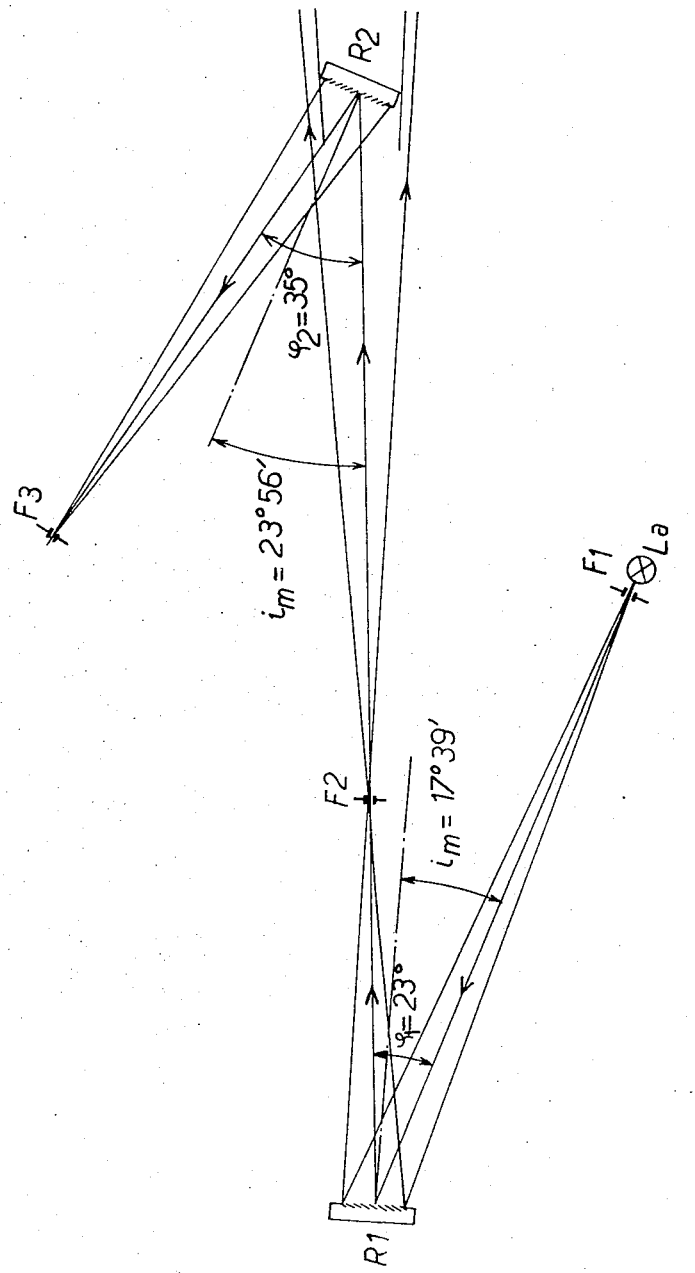

MONOCHROMATORS WITH CONCAVE SPHERICAL GRATINGS

This invention relates to monochromators having concave spherical gratings.

It is an object of the invention to provide single or double monochromators having one or two spherical concave gratings and satisfying the following conditions:

1. Fixed inlet and outlets slits;
2. Fixed inlet and outlet directions for the light beam;
3. Wavelength control by the simple rotation of the grating or gratings about an axis parallel to the inlet and outlet slits and to the lines of the grating, the axis passing through its apex;
4. Considerable energy in the emergent luminous flux;
5. Concentration of the luminous flux over a very small vertical dimension of the outlet slit.

Conditions 1, 2 and 3 are necessary in order to obtain a monochromator of a simple and rugged construction. Conditions 4 and 5 require slight astigmatism and reduced polarization of the light beam.

On the other hand, only weak resolution is required of the said monochromators, i.e. a pass band of the order of a few dozen Angstroms, this not varying, however, by more than 5 percent in the course of exploring the working spectral domain.

A number of monochromator mountings are already known. These mountings can be divided into three categories:

1. Mountings making use of one or more attached mirrors, such as EBERT-FASTIE, CZERNY-TURNER and WADSWORTH mountings. These do not meet condition 4 because of the loss of energy resulting from additional reflection from the mirrors.

2. Mountings the focussing of which (for instance on the ROWLAND circle) is permanently ensured by mechanical displacements of the grating or the slits, these mountings comprising those of ROWLAND, ABNEY, WADSWORTH, PASCHEN-RUNGE, EAGLE, BEUTLER and JOHNSON-ONAKA.

All the above mountings, which do not meet conditions 1, 2 and 3 set out above simultaneously, and are already mechanically complex merely with a single grating, become for the most part impracticable in the case of a double mounting.

3. The SEYA-NAMIOKA mounting.

This mounting possesses very good resolution (of the order of 1 Angstrom) and meets conditions 1, 2 and 3 above while ensuring excellent focussing over the entire working spectrum. In this mounting, however, the angle of deviation of the light beam is high (of the order of 70°), which involves considerable astigmatism. With a single mounting, and a fortiori with a double mounting, the luminous flux extends over a very great part of the height of the outlet slit, which is contrary to condition 5. Further, the high incidence value on the grating and on the facets of the latter bring about pronounced polarization in the emergent beam, this, especially in the case of a double mounting, causing considerable weakening at certain points of the working spectral domain. This mounting therefore does not meet condition 4 either.

It will be seen, therefore, that no prior already-known mounting meets conditions 1 to 5 as cited above.

According to the invention, these conditions are satisfied by means of a single monochromator comprising a fixed inlet slit, a fixed outlet slit and a concave spherical grating able to rotate about a fixed axis, parallel to the slits and to the lines of the grating, the axis passing through the grating apex, in which the distance from the inlet slit to the grating $L$ satisfies the relationship:

$$L = [2R \sin \phi \cos i_m]/[2 \sin \phi - (R\lambda_m/a) \cos r_m] \quad (I)$$

where $\phi$ is the angle of deviation of the light beam through the grating, $R$ is the radius of curvature of the grating, $\lambda_m$ is the mean wavelength of the working spectral range, $i_m$ and $r_m$ are the angles of incidence and of diffraction respectively for $\lambda_m$ in relation to the perpendicular at the apex of the grating, $a$ is the pitch of the grating and $k$ the order of the operative procedure; given the following conditions:

the order $k$ of the operative procedure is selected from the sign of the angle of incidence $i$, which means $i > r$ when $i$ is positive (the case in the normal configuration), and $i < r$ if $i$ is negative, the sign conventions being illustrated by the following diagram, in which $i$, $r$ and $\phi$ are selected to be conventionally positive:

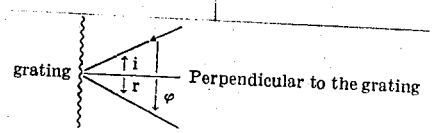

and in which the angle $\phi$ is selected to be less than 40°, and preferably less than 30°, but at least equal to 29 ($k \lambda_m/aa$) where $k$, $\lambda_m$ and $a$ are as defined previously, $\lambda_m$ and $a$ being expressed in the same units (microns, for example) and the value of $\phi$ being in degrees.

Equation (I) may, for easier calculation, be expressed in the form:

$$L = R \frac{\sqrt{4a^2 \cos^2 \frac{\varphi}{2} - k^2 \lambda_m^2} - k\lambda_m \tan \frac{\varphi}{2}}{2a - \frac{k\lambda_m}{\sin \varphi} \left( \sqrt{\cos^2 \frac{\varphi}{2} - \frac{k^2\lambda_m^2}{4a^2}} + \frac{k\lambda_m}{2a} \tan \frac{\varphi}{2} \right)} \quad (II)$$

With the distance $L$ from the source to the grating determined by Equation (I) or (II), the distance $L_t$ from the grating to the tangential focal length varies according to the relationship $$L_t = (RL \cos^2 r)/[L(\cos i + \cos r) - R \cos^2 i] \quad (III)$$

For greater ease in calculating, this may be expressed in the form:

$$L_t = R \cdot \frac{\sqrt{4a^2 \cos^2 \frac{\varphi}{2} - k^2 \lambda_m^2} + k\lambda_m \cdot \tan \frac{\varphi}{2}}{2a + \frac{k\lambda_m}{\sin} \left( \sqrt{\cos^2 \frac{\varphi}{2} - \frac{k^2\lambda_m^2}{4a^2}} - \frac{k\lambda_m}{2a} \tan \frac{\varphi}{2} \right)} \quad (IV)$$

This formula is merely Formula (II) in which $k$ has been changed to $-k$.

The distance $L_t$ varies as a function of $\lambda$, passing through a maximum for $\lambda_m$ and through minima for the extreme values of $\lambda$ in the working range. In order to reduce as much as possible the gap between the position of the outlet slit and the position of the tangential focal length, the outlet slit will be arranged midway between $L_t$ for $\lambda_m$ and $L_t$ for the extreme $\lambda$. This distance apart is generally equal to a fraction of a millimeter.

The grating employed in a single mounting should preferably have an angle of diffraction such that the direction of maximum energy (i.e. that of reflection on the facets) should be, for $\lambda_m$, that of the outlet slit for the order selected (generally the first order).

The invention likewise relates to a double monochromator formed of two single monochromators as defined above, the outlet slit of the first single monochromator acting as the inlet slit for the second single monochromator of the double mounting. It is advantageous for the mounting of the two single monochromators to be carried into effect according to a Z-shaped arrangement.

The advantage of the double mounting over the single mounting resides mainly in the possibility of eliminating stray light, a well-known technique.

The invention will now be described by way of example with reference to the accompanying drawing the single FIGURE of which is a diagrammatic view of a double monochromator.

The double monochromator, which is designed to operate between 1000 and 2500 A. (remote ultra-violet) comprises a source constituted by a windowless lamp $L_A$, a fixed inlet slit $F_1$ for a first concave spherical grating $R_1$, an outlet slit $F_2$ for the first grating that acts as the inlet slit for a second concave spherical grating $R_2$, and an outlet slit $F_3$ for the grating $R_2$. The gratings $R_1$ and $R_2$ are able to rotate in a synchronized manner about axes parallel to the inlet and outlet slits and to the lines of the gratings, the axes passing through their apex.

The characteristics of the apparatus are set out in the following Table:

| | Grating $R_1$ | Grating $R_2$ |
|---|---|---|
| Make | Bausch & Lomb | Jobin-Yven |
| Catalogue No. | 35 52 00 72 | 6 Ca |
| Radius of curvature | 400.7 mm | 500 mm |
| Engraved area | 30 × 38 mm | 54 × 54 mm |
| Number of lines per millimeter | 1200 | 1221.2 |
| Angle of diffraction | 7°7' | 5°15' |
| Angle of deviation $\phi$ | 23° | 35° |
| Angle of incidence for | 15°6' | 21°10.2' |
| Angle of incidence for $\lambda = 2500$ A. | 20°18.3' | 26°42.6' |
| Rotation of the grating between 1000 and 2500 A. | 5°/2.3' | 5°32.4' |
| Distance from inlet slit to grating | 521.32 mm | 559.26 mm |
| Distance from grating to outlet slit | 317.38 mm | 419 mm |
| Mean level of astigmatism (for $\lambda = $ 1750 A.) | 1.94 mm | 8.65 mm |
| Maximum defocussing | 0.24 mm | 0.32 mm |

Apart from this, the widths of the slits $F_1 F_2$ and $F_3$ are 2.45, 1.43 and 1.00 mm respectively, this making it possible to obtain a pass band of the order of 20 A.

Naturally, the combination of the mounting and of the mode of utilization should be in vacuo when operating in the remote ultra-violet region. The mounting also comprises, as is conventional in this type of equipment, means of adjustment and of control necessary for the proper operation of the apparatus.

The correct operation of the monochromator is dependent on precise adjustment of the angle or angles $\phi$, as well as of the distances $L$ and $L_t$.

The said adjustments presuppose the possibility of slightly displacing a slit and the grating in the case of a single monochromator, or the inlet slit $F_1$, the outlet slit $F_3$ and both gratings in the case of a double monochromator. This displacement has a single degree of freedom in respect of the grating or gratings (so as to adjust the slit-to-grating distance), but should be capable of being carried out according to two horizontal directions at right angles to each other in respect of the slit or slits (so as to adjust one distance and the angle $\phi$).

The principle is as follows:

A spectral lamp emitting a visible radiation $\lambda$ is placed in front of a slit, and after the other slit has been removed a mark is made, in the direction of the outlet, in respect of the exact position of the tangential focal length which is provided by the appropriately oriented grating, this being with the aid of an accurate sighting device mounting on an optical bench (a magnifier + a finely etched glass, a Foucault device, ...). The accuracy should be to at least 1/10 of a millimeter.

The absolute positions (in relation to the grating) of the tangential focal lengths, in the orders 1, 0, −1 (which are obtained by rotating the grating), are not known precisely, but their differences can thus be measured with great precision.

In denoting the (unknown) adjustment errors of the monochromator in respect of source-to-grating distances and in respect of the angle $\phi$ by $dL$ and $d\phi\lambda$, it is permissible to write:

$L_t (\lambda)_k$ as measured $L_t (\lambda)_k$ (theoretical) + $dL$. $(\delta/\delta L) (L_t)_k + d\phi$. $(\delta/\delta \phi) (L_t)k$, $k$ assuming the values +1, 0, −1.

There are thus three equations available, the differences of which give the distances $L_t (\lambda)_{k1} - L_t (\lambda)_{k2}$ which have been measured.

Hence one obtains a system of two equations with two unknowns, $dL$ and $d$ which indicate the errors in respect of $L$ and $\phi$, this making it possible to adjust the mounting.

The slit that had been removed is then replaced so as to appear clearly in the sighting device at the spot determined by the calculation (this corresponding to utilization no longer around $\lambda$ but around a wavelength which may be invisible).

The coefficients $(\delta/\delta L) (L_t)_k$ and $(\delta/\delta \phi) (L_t)_k$ are as follows:

$$\frac{\partial}{\partial L} (L_t) = -\left( \frac{R \cos i \cos r}{L (\cos i + \cos r) - R \cos^2 i} \right)^2 \quad (V)$$

$$\frac{\partial}{\partial \varphi} (Lt) = \frac{R \cos r}{\left( \cos i + \cos r \right) - \frac{R}{L} \cos^2 i} \cdot \left( \frac{k\lambda}{2a \cos^2 \frac{\varphi}{2}} - \frac{\sin \varphi}{\cos i + \cos r} \right) + R \left( \frac{\cos r}{\cos i + \cos r - \frac{R}{L} \cos^2 i} \right)^2$$

$$\left[ \frac{\sin \varphi}{\cos i + \cos r} - \frac{R \cos i}{L} \left( \frac{\sin \varphi}{\cos i + \cos r} + \frac{k}{2a \cos^2 \frac{\varphi}{2}} \right) \right]$$

(VI)

$L$ being given by Formula (II) and the theoretical $L_t (\lambda)_k$ by Formula (III). For Formulas (III), (V) and (VI), the following obtains:

$$\cos i = \frac{1}{2}\left(\sqrt{4\cos^2\frac{\varphi}{2} - \frac{k^2\lambda^2}{a^2}} - \frac{k\lambda}{a}\tan\frac{\varphi}{2}\right) \quad \text{(VII)}$$

$$\cos r = \frac{1}{2}\left(\sqrt{4\cos^2\frac{\varphi}{2} - \frac{k^2\lambda^2}{a^2}} + \frac{k\lambda}{a}\tan\frac{\varphi}{2}\right) \quad \text{(VIII)}$$

The distances between tangential focal lengths should be of the order of several centimeters.

If these distances are insufficient, work will be carried out with $k$ having the values 2, 0, −2, or 3, 0, −3, for example.

If these distances are too great (in excess of 10 cm, for example), it will be necessary to repeat the procedure employed for $k$ having the values 1, 0, −1 using two visible wavelengths supplied by one or two spectral lamps (approximately 4500 and 6000 A., for example) or even three visible wavelengths (4500, 5500 and 6500 A. approximately).

For the adjustment of a single monochromator, the spectral lamp will be positioned either behind the inlet slit or behind the outlet slit (in which case it will be necessary to alter $k$ to $-k$ in Formulas (VII) and (VIII).

For the adjustment of a double monochromator, the sole difference will reside in the fact that, at the time of adjusting the second grating, it is no longer possible to change the position of the intermediate slit $F_2$: the spectral lamp will therefore have to be placed behind this slit, and fine adjustments in the distance $L_2 = F_2R_2$ will be effected by shifting the grating $R_2$.

By way of comparison, a SEYA-NAMIOKA double mounting would, for the first grating, possess a level of astigmatism approximately 10 times greater and, for the second grating, a level of astigmatism approximately four times larger. Furthermore, the energy gain is of the order of 4 in relation to a SEYA-NAMIOKA double mounting, there further being no risk of weakening the beam by polarization.

Monochromators according to the invention are employed in industry, for example, for the study of photomultipliers which operate in the remote ultraviolet region.

It is self-evident that the embodiments described are only examples and that it would be possible to modify them, more especially by substituting technical equivalents, without thereby going beyond the scope of the invention.

We claim:

1. A monochromator comprising a fixed inlet slit, a fixed outlet slit and a concave spherical grating rotatable about a fixed axis which is parallel to the slits and to the lines of the grating, said axis passing through the apex of the grating, wherein the distance $L$ from the inlet slit to the grating satisfies the relationship $$L = [2R \sin\phi \cos i_m]/[\sin\phi - (k\lambda_m/a a)\cos r_m]$$

where $\phi$ is angle of deviation of the light beam through the grating, $R$ is the radius of curvature of the grating, $\lambda_m$ is the mean wavelength of the working spectral range, $i_m$ and $r_m$ are the angles of incidence and of diffraction respectively for $\lambda_m$ in relation to the perpendicular at the apex of the grating, $a$ is the pitch of the grating and $k$ is the order of the operative procedure; the angle $\phi$ being selected to be less than 40° but at least equal to 29 $(k\lambda_m/a)$ where $k, \lambda_m$ and $a$ are as defined above, $\lambda_m$ and $a$ being expressed in the same units and the value of $\phi$ being in degrees.

2. A monochromator according to claim 1, wherein $\phi$ is less than 30°.

3. A monochromator according to claim 1, wherein the outlet slit is arranged midway between the position of the tangential focal length for $\lambda_m$ and that of the tangential focal length for light whose wavelength is at one of the limits of the working spectral range.

4. A monochromator according to claim 1, in combination with a like second monochromator, said first and second monochromators constituting a double monochromator and the outlet slit of the first monochromator constituting the inlet slit of the second monochromator.

5. A double monochromator according to claim 4, wherein the outlet slits are each arranged midway between the position of the tangential focal length for $\lambda_m$ and that of the tangential focal length for light whose wavelength is at one of the limits of the working spectral range.

* * * * *